United States Patent [19]
Komurasaki

[11] Patent Number: 5,119,783
[45] Date of Patent: Jun. 9, 1992

[54] CONTROL APPARATUS FOR AN INTERNAL COMBUSTION ENGINE

[75] Inventor: Satosi Komurasaki, Himeji, Japan

[73] Assignee: Mitsubishi Denki K.K., Tokyo, Japan

[21] Appl. No.: 416,557

[22] Filed: Oct. 3, 1989

[30] Foreign Application Priority Data

Oct. 4, 1988 [JP] Japan ................. 63-249072
Oct. 6, 1988 [JP] Japan ................. 63-250907

[51] Int. Cl.⁵ .................. F02P 5/15; F02D 17/02
[52] U.S. Cl. .................. 123/425; 123/198 F; 123/481; 73/117.3
[58] Field of Search ........... 123/198 F, 425, 435, 123/436, 481; 73/117.3

[56] References Cited

U.S. PATENT DOCUMENTS

| | | | |
|---|---|---|---|
| 3,916,622 | 11/1975 | Gospodar | 123/198 F X |
| 4,023,358 | 5/1977 | Maurer et al. | 123/198 F X |
| 4,024,850 | 5/1977 | Peter et al. | 123/198 F |
| 4,426,972 | 1/1984 | Kimura et al. | 123/378 |
| 4,586,369 | 5/1986 | Vogler | 73/117.3 |
| 4,606,316 | 8/1986 | Komurasaki | 123/425 |
| 4,821,194 | 4/1989 | Kawamura | 123/425 X |
| 4,846,128 | 7/1989 | Yagi et al. | 123/425 |
| 4,887,574 | 12/1989 | Kuroiwa et al. | 123/425 |
| 5,005,549 | 4/1991 | Pernpeintner et al. | 123/417 X |

FOREIGN PATENT DOCUMENTS 33514 4/1981 Japan ................. 123/436

*Primary Examiner*—Tony M. Argenbright
*Attorney, Agent, or Firm*—Sughrue, Mion, Zinn, Macpeak & Seas

[57] ABSTRACT

A control apparatus for an internal combustion engine has a vibration sensor which senses engine vibrations and a low-pass filter which passes a low-frequency component of the output of the vibration sensor. A comparator detects misfiring when the level of the low-frequency component exceeds a prescribed reference level. When misfiring is detected, a microcomputer identifies the misfiring cylinder and stops the supply of fuel to the misfiring cylinder. The control apparatus may also include a knocking suppression device responsive to a component of the output signal of the vibration sensor.

15 Claims, 4 Drawing Sheets

FIG. 5 / FIG. 6
(a) VIBRATION SENSOR
(b) BAND-PASS FILTER
(c) GATE CONTROLLER
(d) COMPARATOR INPUTS
(e) COMPARATOR OUTPUT
(f) INTEGRATOR
(g) WAVEFORM SHAPER
(h) PHASE SHIFTER
→ TIME

CONTROL APPARATUS FOR AN INTERNAL COMBUSTION ENGINE

BACKGROUND OF THE INVENTION

This invention relates to a control apparatus for an internal combustion engine which can stop the supply of fuel to a misfiring cylinder of the engine.

In an internal combustion engine, due to breakage of parts, poor electrical connections, or malfunction of equipment such as the ignition coil, combustion occasionally does not take place properly in one or more cylinders of the engine and so-called "misfiring" occurs. Due to misfiring, a mixture of uncombusted fuel and air is discharged from the engine.

Many automobiles are equipped with a catalytic converter for removing harmful components from the engine exhaust gases. A typical catalytic converter is a three-way catalytic converter which simultaneously oxidizes carbon monoxide and hydrocarbons while it reduces oxides of nitrogen (NOx). In order for a catalytic converter to function effectively, it is important that the air-fuel ratio for the engine be near the stoichiometric ratio and for the fuel to be properly combusted in the cylinders.

When misfiring takes place in an engine, the uncombusted air-fuel mixture which is discharged from the engine flows into the catalytic converter, and a sudden chemical reaction takes place, causing an enormous increase in the temperature of the catalytic converter. Under these conditions, the catalytic converter can not function properly, and harmful exhaust gases are discharged into the atmosphere. The increase in temperature also produces degradation of the catalytic converter and shortens its life span. Furthermore, when an automobile is stationary, if dead grass or other combustible material should contact the catalytic converter when it is at an abnormally high temperature due to misfiring, there is the possibility of a fire starting.

It is therefore highly desirable to be able to detect a misfiring cylinder and stop the supply of fuel to that cylinder. One type of conventional misfiring sensor monitors the voltage across the primary winding of the ignition coil of an engine. This voltage normally has a prescribed periodic nature which is determined by the rotational speed of the engine. If the period of the voltage is irregular and a voltage is not generated at proper intervals, it is determined that the ignition coil or some other portion of the ignition system is malfunctioning and that misfiring is taking place. The misfiring sensor then generates a warning in the form of a warning light or buzzer and sends control signals to the engine control apparatus, which cuts off the supply of fuel to the cylinders.

However, the above-described conventional misfiring sensor is only able to detect misfiring due to malfunctions of the ignition system in or on the upstream side of the ignition coil. It is unable to detect misfiring due to problems with equipment on the downstream side of the ignition coil, such as spark plugs, the distributor, or connecting wires, and it is unable to detect misfiring due to problems with other systems of the engine, such as the fuel supply system of the engine. Thus, there are many cases in which a conventional misfiring sensor cannot detect misfiring.

SUMMARY OF THE INVENTION

Accordingly, it is an object of the present invention to provide an engine control apparatus for an internal combustion engine which can accurately detect the occurrence of misfiring due to any cause.

It is another problem of the present invention to provide an engine control apparatus which can both detect misfiring and suppress engine knocking.

In accordance with the present invention, a misfiring cylinder of an engine is sensed based on low-frequency engine vibrations which are produced at the time of misfiring. These low-frequency vibrations occur regardless of the cause of misfiring, so the present invention can reliably detect misfiring in many cases in which a conventional misfiring sensor could not do so.

A control apparatus according to the present invention comprises vibration sensing means for generating an output signal having a level corresponding to the amplitude of low-frequency engine vibrations due to misfiring, comparator means for detecting misfiring by comparing the level of the output signal of the vibration sensing means with a reference level indicating the occurrence of misfiring, and fuel supply control means responsive to the comparator means for identifying which cylinder of the engine is misfiring when the detector means detects misfiring and stopping the supply of fuel to the misfiring cylinder.

In a preferred embodiment, the vibration sensing means includes a vibration sensor which can sense engine vibrations over a relatively wide frequency range and generates an electrical output signal indicative of the frequency and amplitude of vibrations. The output signal of the vibration sensor is passed through a low-pass filter which selects the frequency component of the output signal of the vibration sensor including vibrations due to misfiring.

The present invention may also include a knocking suppression device which is responsive to the output signal of the vibration sensor. The knocking suppression device detects knocking by identifying components due to knocking in the output signal of the vibration sensor and then controls the engine ignition timing to suppress knocking.

BRIEF DESCRIPTION OF THE DRAWINGS

FIGS. 5(a–h) are a waveform diagram of the output signals of various portions of the embodiment of FIG. 3 when knocking is not taking place.

FIGS. 6(a–h) are a waveform diagram of the output signals of various portions of the embodiment of FIG. 3 when knocking is taking place.

DESCRIPTION OF THE PREFERRED EMBODIMENTS

Figure 1:
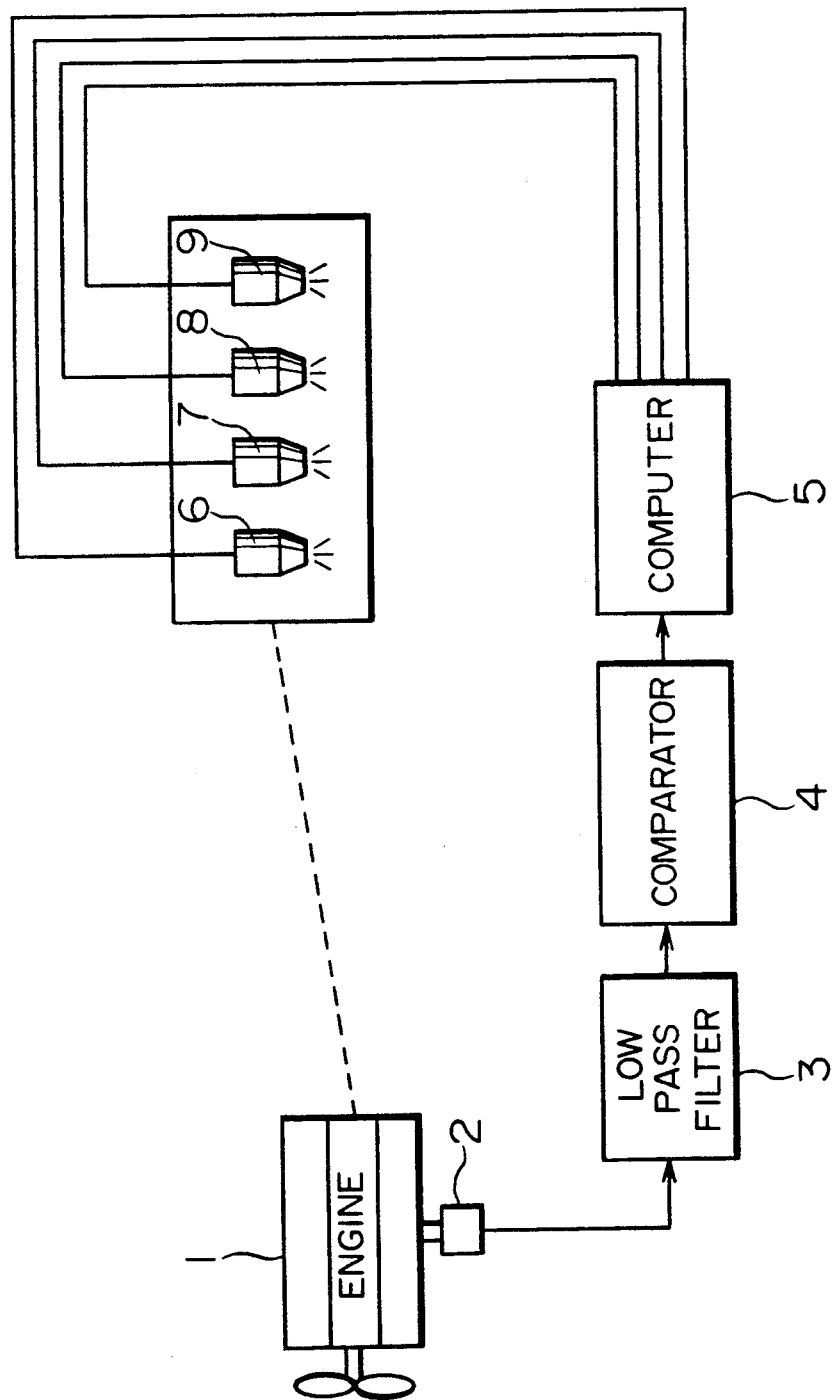
FIG. 1 is a block diagram of a first embodiment of an engine control apparatus according to the present invention.

A number of preferred embodiments of the present invention will now be described while referring to the accompanying drawings. FIG. 1 is a block diagram of a first embodiment as applied to a four-cylinder engine, although the number of cylinders in the engine is not critical. As shown in this figure, a vibration sensor 2 is mounted on an engine 1. The vibration sensor 2 senses the mechanical vibrations of the engine and generates an electrical output signal having a frequency and amplitude corresponding to that of mechanical vibrations which it senses. The output signal of the vibration sensor 2 is input to a low-pass filter 3, which outputs the low-frequency component of the input signal to a comparator 4. The comparator 4 compares the amplitude of the low frequency signal from the low-pass filter 3 with a prescribed reference level and generates an output signal when the reference level is exceeded. The output signal of the comparator 4 is provided to a microcomputer 5. The microcomputer 5 receives input signals from a number of unillustrated sensors which monitor various aspects of engine operation, such as the intake air pressure, the cooling water temperature, and the engine rotational speed. Based on these input signals and the output signal of the comparator 4, the microcomputer 5 controls the supply of fuel to four fuel injectors 6-9, each of which is associated with one of the cylinders of the engine 1.

Figure 2:
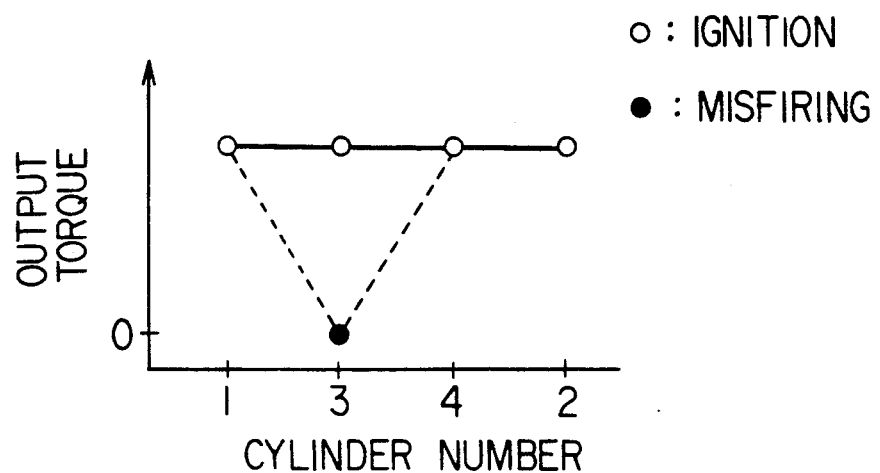
FIG. 2 is a graph showing the output torque of an engine when one of the cylinders of the engine is misfiring.

The principles of operation of this embodiment will be explained while referring to FIG. 2, which is a graph of the output torque of a four-cylinder engine at the time of firing of each cylinder. When all four cylinders are firing properly, the output torque remains substantially constant at the level shown by the hollow circles in the figure. However, when one of the cylinders misfires, such as cylinder #3, there is a sudden drop in the output torque during the power stroke for the misfiring cylinder, as shown by the solid circle, and the sudden drop in torque causes a shock to be imparted to the engine. The larger the throttle opening, the larger is the shock when misfiring takes place.

The engine vibrations are sensed by the vibration sensor 2. The shocks due to the misfiring cylinder occur only once each cycle of the engine, so the frequency of the shocks is lower than that of other mechanical vibrations of the engine which are sensed by the vibration sensor 2. Therefore, the output signal of the vibration sensor 2 will include a low frequency component corresponding to the frequency of the shocks. This low frequency component is separated from the other components of the output signal of the vibration sensor 2 by the low-pass filter 3 and input to the comparator 4, which compares it with a reference level. The reference level is chosen to be smaller than the expected level of signals from the low-pass filter 3 due to misfiring, so when misfiring takes place, the reference level is exceeded and the comparator 4 generates an output signal indicating the occurrence of misfiring and provides it to the microcomputer 5.

As mentioned previously, the microcomputer 5 receives input signals from a number of unillustrated sensors. These sensors generally include a cylinder recognition device which generates pulses in synchrony with the engine rotation. Based on these pulses, the microcomputer 5 can easily determine which cylinder is firing at any given time using methods well known to those skilled in the art. The ability to identify each cylinder is a standard feature of modern microcomputers used for the control of fuel injection. Therefore, when the comparator 4 generates an output signal indicating the occurrence of misfiring, the microcomputer 5 can determine which of the cylinders is misfiring. The microcomputer 5 then prevents the corresponding fuel injector from supplying fuel to the misfiring cylinder, while the microcomputer 5 continues to control the other fuel injectors so as to perform normal operation.

As no fuel is supplied to the misfiring cylinder, uncombusted fuel is prevented from being discharged from the engine. Therefore, the catalytic converter is prevented from damage or degradation due to overheating caused by an uncombusted fuel-air mixture entering the catalytic converter, and there is no discharge of harmful gases from the engine to the atmosphere.

In the embodiment of FIG. 1, the output of the vibration sensor 2 is input to a low-pass filter 3, and the low frequency component of the output of the sensor 2 is selected out. This method is employed because the frequency response of the vibration sensor 2 is essentially flat. Instead of using a vibration sensor of this type, it is instead possible to use a resonance-type sensor which has resonance at a low frequency corresponding to the frequency of shocks due to misfiring. However, it is easier to adjust a low-pass filter to a prescribed frequency range than to tune a resonance-type sensor, so from this standpoint, the arrangement of FIG. 1 is superior to one employing a resonance-type vibration sensor.

Figure 3:
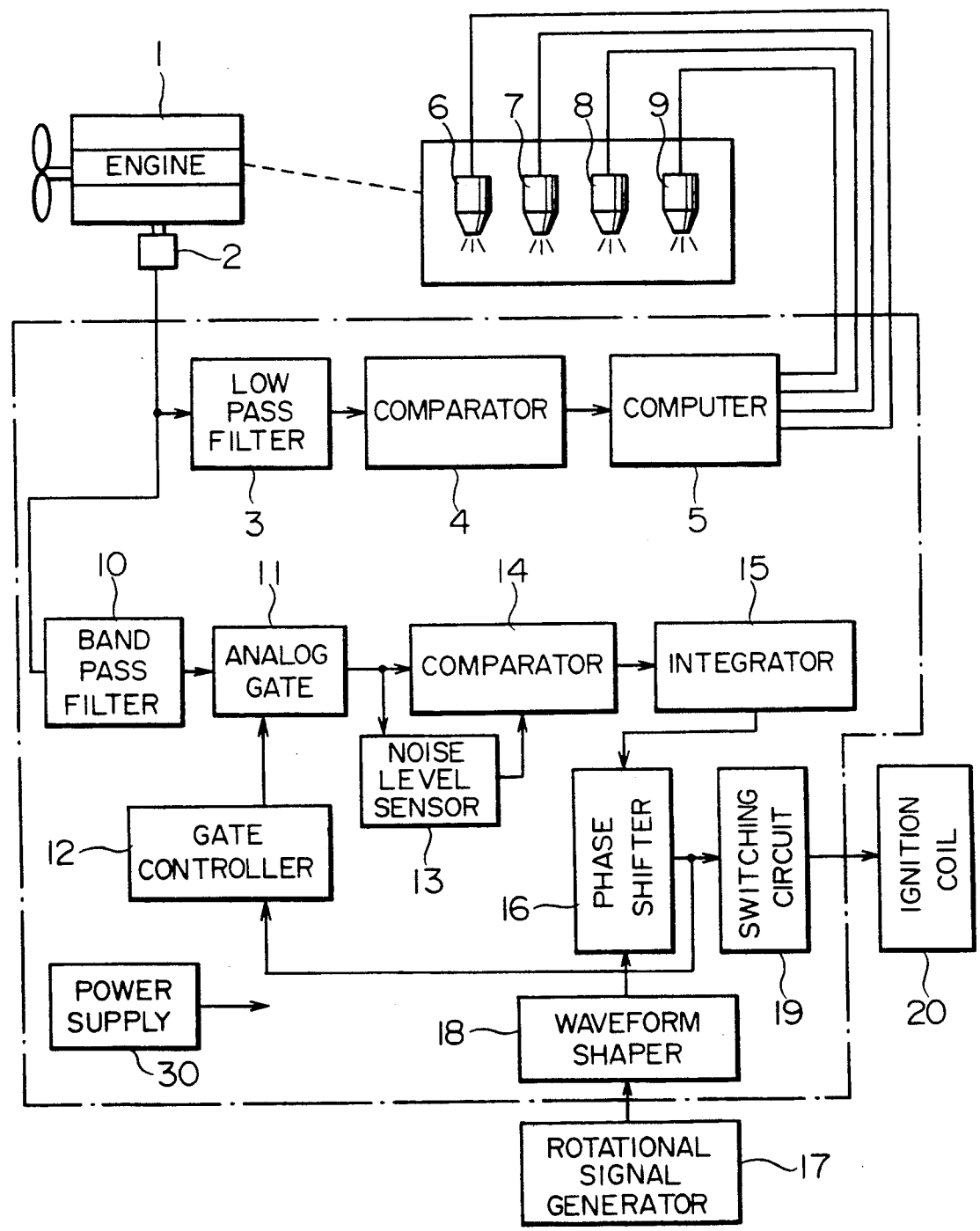
FIG. 3 is a block diagram of a second embodiment of the present invention which senses misfiring cylinders and suppresses engine knocking.

In addition to being used for sensing misfiring, the output of the vibration sensor 2 can also be used for detecting engine knocking. FIG. 3 is a block diagram of a second embodiment of an engine control apparatus according to the present invention which detects both misfiring and knocking using a single vibration sensor. As shown in this figure, a vibration sensor 2 is mounted on an engine 1 in the same manner as in the embodiment of FIG. 1. The low-pass filter 3, the comparator 4, and the microcomputer 5 of this figure are the same in structure and operation as the corresponding parts in FIG. 1, so an explanation of these parts will be omitted.

The output signal of the vibration sensor 2 is input to both the low-pass filter 3 and to a band-pass filter 10. The band-pass filter 10 passes only that component of the output signal of the vibration sensor 2 lying in a frequency band corresponding to engine knocking. This component is input to an analog gate 11 which can be turned on and off in order to block noise which is an impediment to the detection of knocking signals. The opening and closing of the analog gate 11 is controlled by a gate control apparatus 12. The output of the analog gate 11 is provided to a noise level sensor 13 which generates an output signal having a DC voltage which is proportional to the average amplitude of the rectified output of the analog gate 11.

The frequency of engine knocking is higher than the frequency of the previously-described shocks due to misfiring, so the vibration sensor 2 should have a frequency range broad enough to cover both frequencies.

The output of the analog gate 11 and the output of the noise level sensor 13 are input to a comparator 14, which generates output pulses when the input signal from the analog gate 11 is higher than the input signal from the noise level sensor 13. The output pulses from the comparator 14 are integrated by an integrator 15, which generates an output signal whose voltage corresponds to the strength of the knocking of the engine.

A rotational signal generator 17 generates pulses at a frequency corresponding to the rotational speed of the engine. These pulses are shaped by a waveform shaper 18 and input to a phase shifter 16. The output signal of the integrator 15 is also provided to the phase shifter 16. The phase shifter 16 generates output pulses having a phase which is shifted from that of the output of the waveform shaper 18 by an amount corresponding to the magnitude of the output signal of the integrator 15. The output pulses of the phase shifter 16 operate a switching circuit 19 which controls the supply of current to an ignition coil 20 for the unillustrated spark plugs of the engine. Electrical power is supplied to all the electrical components of the control apparatus of FIG. 3 by a power supply 30.

Figure 4:
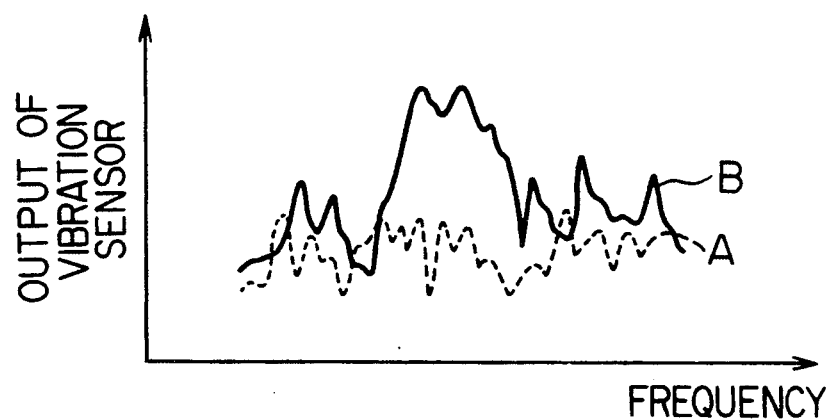
FIG. 4 is a graph of the frequency characteristics of engine noise in the absence (curve A) and the presence (curve B) of knocking.

FIG. 4 illustrates the frequency characteristics of the output signal of the vibration sensor 2. In the figure, curve A shows the characteristics of the output signal when there is no knocking, and curve B shows the characteristics of the output signal when knocking is occurring. In addition to a knocking signal (a signal which is generated by knocking), the output signal of the vibration sensor 2 contains various other noise components such as components due to mechanical noise of the engine, ignition noise, and noise due to the signal transmission pathway.

Comparing curve A and curve B of FIG. 4, it can be seen that the knocking signal has unique frequency characteristics. Although the frequency distribution of the knocking signal will differ from engine to engine and in accordance with differences in the location in which the vibration sensor 2 is mounted, there is always a clear difference in the characteristics of the output of the vibration sensor 2 when knocking is taking place.

By passing only the frequency component corresponding to the knocking signal, noise at other frequencies is suppressed and the knocking signal can be efficiently detected.

The operation of elements 10 through 20 of the embodiment of FIG. 3 will be explained while referring to FIGS. 5 and 6, which illustrate the waveforms of the output signals of various portions of this embodiment. FIG. 5 illustrates the case when there is no knocking and FIG. 6 illustrates the case when knocking is taking place in the engine. When the engine is running, the ignition signal which is generated by the rotational signal generator 17 in accordance with previously-determined ignition timing characteristics undergoes waveform shaping in the waveform shaping circuit 18 to form pulses, which are input to the phase shifter 16. The pulses from the waveform shaping circuit 18 drive the switching circuit 19 via the phase shifter 16 and switch the current to the ignition coil 20 on and off. When the current to the ignition coil 20 is cut off, the ignition coil 20 generates a high voltage which is applied to the unillustrated spark plugs of the engine.

The engine vibrations which occur during engine operation are detected by the vibration sensor 2, which generates an output signal as shown by FIG. 5a. When the engine is not knocking, the output signal of the vibration sensor 2 does not include a component due to knocking, but it includes components due to other mechanical vibrations or due to ignition noise which is superimposed on the signal transmission pathway at the time of firing F of the cylinders.

This signal is passed through the band-pass filter 10, and a large part of the mechanical noise component is suppressed, as shown in FIG. 5b. However, as the ignition noise component is strong, it has a high level even after passing through the band-pass filter 10, as shown by the spikes in FIG. 5b.

In order to prevent the ignition noise from being misidentified as knocking signals, the analog gate 11 is closed for a prescribed length of time each time one of the cylinders is fired. The analog gate 11 is closed by a pulse (FIG. 5c) which is output by the gate control apparatus 12, which is triggered by the output of the phase shifter 16. As a result, the ignition noise is removed, and only low-level mechanical noise remains in the output of the analog gate 11, as shown by curve (i) of FIG. 5d. This output signal is provided to the noise level sensor 13 and the comparator 14.

The noise level sensor 13 responds to changes in the peak level of the output signal of the analog gate 11. It can respond to a relatively gradual change in the peak value of normal mechanical noise, and it generates an output signal having a DC voltage which is slightly higher than the peak of the mechanical noise (curve (ii) in FIG. 5d). This output signal is also provided to the comparator 14.

The comparator 14 generates an output signal when the input signal from the analog gate 11 is higher than the input signal from the noise level sensor 13. As shown in FIG. 5d, when knocking is not taking place, the output of the noise level sensor 13 is higher than the average peak value of the output signal of the analog gate 11. Therefore, as shown in FIG. 5e, there is no output from the comparator 14.

The integrator 15 integrates the output signal from the comparator 14, and when knocking is not taking place, the output signal of the integrator 15 is zero as shown in FIG. 5f.

The phase shifter 16 shifts the phase of the input signal from the waveform shaper 18 (shown by FIG. 5g) in accordance with the voltage of the output signal of the integrator 15. Since the integrator 15 output voltage is zero, when there is no knocking, the phase shifter 16 does not produce a phase shift, and the output signal of the phase shifter 16 (FIG. 5h) is in phase with the output signal of the waveform shaper 18. As a result, the engine is operated with a reference ignition timing.

However, when knocking takes place, the output of the vibration sensor 2 contains a knocking signal which is delayed from the ignition timing by a certain amount, as shown in FIG. 6a. After the output of the vibration sensor 2 passes through the band-pass filter 10 and the analog gate 11, it consists of mechanical noise on which the knocking signal is superimposed, as shown by curve (i) in FIG. 6d.

Of the signals which pass through the analog gate 11, the knocking signal has a particularly steep rise, so the response of the output voltage of the noise level sensor 13 is delayed with respect to the knocking signal. As a result, the inputs to the comparator 14 are as shown by curves (i) and (ii) in FIG. 6d, and the comparator 14 generates output pulses, as shown in FIG. 6e.

The integrator 15 integrates the pulses from the comparator 14 and generates a voltage corresponding to the amount of knocking, as shown in FIG. 6f. Then, the phase shifter 16 generates an output signal (FIG. 6h) which is delayed with respect to the output signal of the waveform shaper 18 (FIG. 6g) by a prescribed amount corresponding to the output voltage of the integrator 15. Therefore, the ignition timing is retarded by the prescribed amount, and knocking is suppressed.

At the same time, the misfiring sensor comprising the vibration sensor 2, the low-pass filter 3, the comparator 4, and the microcomputer 5 senses misfiring and cut off the supply of fuel to a misfiring cylinder in the same manner as in the embodiment of FIG. 1.

In FIG. 3, the phase shifter 16, the waveform shaper 18, and the switching circuit 19 are shown as individual components, but they could be incorporated into the microcomputer 5.

In accordance with the embodiment of FIG. 3, a single vibration sensor 2 is shared by a misfiring sensor and a knocking suppression circuit, so efficient use is made of components.

What is claimed is:

1. A control apparatus for a multi-cylinder internal combustion engine comprising:
   vibration sensing means for generating an output signal having a level corresponding to the amplitude of low-frequency engine vibrations due to misfiring;
   comparator means for detecting misfiring by comparing the level of the output signal of the vibration sensing means with a reference level indicating the occurrence of misfiring; and
   fuel supply control means responsive to the comparator means for identifying which cylinder of the engine is misfiring when the comparator means detects misfiring and stopping the supply of fuel to the misfiring cylinder.

2. A control apparatus as claimed in claim 1, wherein the vibration sensing means comprises:
   a vibration sensor mounted on the engine which generates an electrical output signal indicative of engine vibrations; and
   a low-pass filter which passes the low frequency component of the output signal of the vibration sensor and provides it to the comparator means as an output signal.

3. A control apparatus as claimed in claim 2, further comprising knocking suppression means responsive to the output signal of the vibration sensor for sensing engine knocking and controlling the ignition timing of the engine to suppress the knocking.

4. A control apparatus as claimed in claim 3, wherein said knocking suppression means includes filter means for providing to said knocking suppression means only a component of said output signal of said vibration sensor which lies in a frequency band corresponding to engine knocking.

5. A control apparatus as claimed in claim 1, wherein said fuel supply means is additionally responsive to sensors which monitor various aspects of engine operation.

6. A control apparatus as claimed in claim 5, wherein said various aspects of engine operation include intake air pressure, cooling water temperature, and engine rotation.

7. A control apparatus as claimed in claim 1, wherein the prescribed frequency range includes a frequency equal to the frequency of firing of the cylinders of the engine divided by the number of cylinders.

8. A method for sensing misfiring of a multi-cylinder internal combustion engine comprising:
   measuring the level of engine vibrations in a prescribed frequency range;
   comparing the level of engine vibrations in said prescribed frequency range with a prescribed reference level;
   determining the misfiring is occurring when the level of engine vibrations is said prescribed frequency range exceeds the prescribed reference level; and
   electronically identifying which cylinder of the engine is misfiring.

9. A method as claimed in claim 8, wherein the prescribed frequency range includes a frequency equal to the frequency of firing of the cylinders of the engine divided by the number of cylinders.

10. A method as claimed in claim 8, wherein said prescribed frequency range is a low-frequency range.

11. A method as claimed in claim 8, further comprising the step of sensing engine knocking in response to said engine vibrations and controlling the ignition timing of the engine to suppress the knocking.

12. A method as claimed in claim 11, wherein said engine knocking sensing step controls the ignition timing in response to a component of said engine vibrations which lies in a frequency bank corresponding to engine knocking.

13. A method as claimed in claim 8, further comprising the step of stopping the supply of fuel to the misfiring cylinder after identifying which cylinder of the engine is misfiring.

14. A method as claimed in claim 13, wherein said identifying step is additionally responsive to sensors which monitor various aspects of engine operation.

15. A method as claimed in claim 14, wherein said various aspects of engine operation include intake air pressure, cooling water temperature, and engine rotation.

* * * * *